US012571625B2

(12) United States Patent     (10) Patent No.:   US 12,571,625 B2

Bertin     (45) Date of Patent:    Mar. 10, 2026

(54) SELF-CORRECTING INDUCTIVE SENSOR

(71) Applicant: SEMICONDUCTOR COMPONENTS INDUSTRIES, LLC, Scottsdale, AZ (US)

(72) Inventor: Jacques Jean Bertin, Pocatello, ID (US)

(73) Assignee: SEMICONDUCTOR COMPONENTS INDUSTRIES, LLC, Scottsdale, AZ (US)

(*) Notice: Subject to any disclaimer, the term of this patent is extended or adjusted under 35 U.S.C. 154(b) by 214 days.

(21) Appl. No.: 18/541,195

(22) Filed: Dec. 15, 2023

(65) Prior Publication Data

US 2025/0198740 A1    Jun. 19, 2025

(51) Int. Cl.
    G01B 7/30        (2006.01)
    G01D 5/20        (2006.01)

(52) U.S. Cl.
    CPC   G01B 7/30 (2013.01); G01D 5/20 (2013.01)

(58) Field of Classification Search
    None
    See application file for complete search history.

(56) References Cited

U.S. PATENT DOCUMENTS

| | | | | |
|---|---|---|---|---|
| 5,489,845 | A * | 2/1996 | Weber | G05B 19/231 |
| | | | | 324/207.16 |
| 6,466,889 | B1 * | 10/2002 | Schodlbauer | G01B 7/02 |
| | | | | 702/150 |
| 8,742,715 | B2 * | 6/2014 | Ortman | G01D 5/2073 |
| | | | | 310/68 B |
| 9,914,477 | B2 * | 3/2018 | Shao | B62D 6/10 |
| 11,525,716 | B2 * | 12/2022 | El-Shennawy | G01D 18/001 |
| 11,592,319 | B2 * | 2/2023 | Ausserlechner | G01D 5/2053 |
| 11,614,344 | B1 * | 3/2023 | Sachse | G01D 5/2448 |
| | | | | 324/207.12 |
| 12,031,817 | B2 * | 7/2024 | Shaga | G01D 5/20 |
| 2014/0117980 | A1 | 5/2014 | Ely | |
| 2018/0202835 | A1 * | 7/2018 | Möller | G01B 7/003 |
| 2020/0041308 | A1 * | 2/2020 | Kuwahara | G01D 5/14 |
| 2020/0292360 | A1 | 9/2020 | Kettering | |
| 2022/0412782 | A1 * | 12/2022 | Konno | G01D 5/58 |
| 2023/0273051 | A1 | 8/2023 | Bertin | |
| 2024/0318984 | A1 * | 9/2024 | Lugani | H01F 27/36 |

FOREIGN PATENT DOCUMENTS

| | | |
|---|---|---|
| CN | 111193357 A | 5/2020 |
| DE | 102011103576 A1 | 12/2012 |
| EP | 1876423 A2 | 1/2008 |
| EP | 2881715 A1 | 6/2015 |

* cited by examiner

*Primary Examiner* — Richard Isla

(74) *Attorney, Agent, or Firm* — Dickinson Wright PLLC

(57) ABSTRACT

A sensor subsystem is disclosed. The sensor subsystem includes a sensor coupled to an interface circuit. The sensor may generate a fine sensor signal and a coarse sensor signal based on a rotation of the sensor. The interface circuit may generate first and second absolute angle values based on the fine and coarse sensor signals, respectively. The interface circuit may additionally generate an output angle value using a difference between the first and second absolute angle values.

20 Claims, 8 Drawing Sheets

*100*

*Lookup*
*Table*
*303*

| 0 to 22.5 | Error Average 401 |
|---|---|
| 22.5 to 45 | Error Average 402 |
| 45 to 67.5 | Error Average 403 |
| 67.5 to 90 | Error Average 404 |
| 90 to 112.5 | Error Average 405 |
| 112.5 to 135 | Error Average 406 |
| 135 to 157.5 | Error Average 407 |
| 157.5 to 180 | Error Average 408 |
| 180 to 202.5 | Error Average 409 |
| 202.5 to 225 | Error Average 410 |
| 225 to 247.5 | Error Average 411 |
| 247.5 to 270 | Error Average 412 |
| 270 to 292.5 | Error Average 413 |
| 292.5 to 315 | Error Average 414 |
| 315 to 337.5 | Error Average 415 |
| 337.5 to 0 | Error Average 416 |

*FIG. 4*

*Start*
*701*

Generating a first absolute angle and a second
absolute angle based on a rotation of a sensor
included in a sensor subsystem
702

Performing a comparison of the first absolute angle
to the second absolute angle
703

Updating a lookup table based on a result of the
comparsion
704

*End*
*705*

SELF-CORRECTING INDUCTIVE SENSOR

BACKGROUND

Technical Field

This disclosure is related to sensors and, more particularly, to inductive angular position sensors.

Description of the Related Art

In many computer and mechanical systems, a variety of sensors may be employed to detect different environmental and operational conditions, and generate analog or digital signals corresponding to the detected conditions. In some systems, temperature sensors may be employed to detect the temperature of a system in order to determine if the system is operating in a specified temperature range. Other systems may employ accelerometer sensors to aid in the determination of movement of the system or part of the system. In robotic systems, rotational sensors may be used to determine how far a portion of a system, e.g., a robotic arm, has rotated.

SUMMARY

Various embodiments of a sensor subsystem are disclosed. Broadly speaking, a sensor subsystem includes a sensor coupled to an interface circuit. The sensor may be configured to generate a fine sensor signal and a coarse sensor signal based on a rotation of the sensor. The interface circuit may be configured to generate a first absolute angle value and a second absolute angle value using the fine sensor signal and the coarse sensor signal, respectively. The interface circuit may be further configured to generate an output angle value using a difference between the first absolute angle value and the second absolute angle value.

BRIEF DESCRIPTION OF THE DRAWINGS

For a detailed description of example embodiments, reference will now be made to the accompanying drawings in which:

FIG. 4 is a block diagram of an embodiment of a lookup table.

Figure 1:
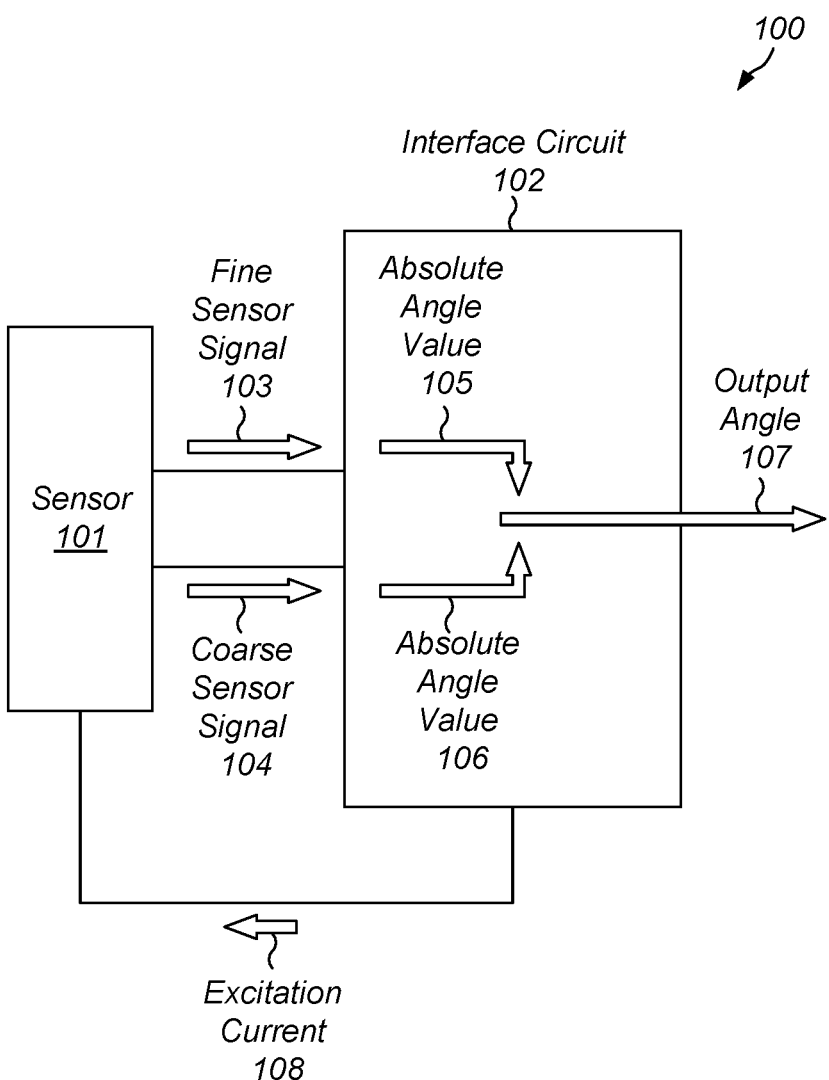
FIG. 1 is a block diagram of an embodiment of a sensor subsystem.

Many of the electrical connections in the drawings are shown as direct couplings having no intervening devices, but are not expressly stated as such in the following description. Nevertheless, this paragraph shall serve as antecedent basis in the claims for referencing any electrical connection as "directly coupled" for electrical connections shown in the drawing with no intervening device(s).

Definitions

Various terms are used to refer to particular system components. Different companies may refer to a component by different names—this document does not intend to distinguish between components that differ in name but not function. In the following discussion and in the claims, the terms "including" and "comprising" are used in an open-ended fashion and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"A," "an," and "the," as used herein, refers to both singular and plural referents unless the context clearly dictates otherwise. By way of example, "a processor" programmed to perform various functions refers to one processor programmed to perform each and every function, or more than one processor collectively programmed to perform each of the various functions.

In relation to electrical devices (whether stand alone or as part of an integrated circuit), the terms "input" and "output" refer to electrical connections to the electrical devices, and shall not be read as verbs requiring action. For example, a differential amplifier (such as an operational amplifier) may have a first differential input and a second differential input, and these "inputs" define electrical connections to the operational amplifier, and shall not be read to require inputting signals to the operational amplifier.

"Controller" or "controller circuit" shall mean, alone or in combination, individual circuit components, an application specific integrated circuit (ASIC), a microcontroller with controlling software, a reduced-instruction-set computing (RISC) circuit with controlling software, a digital signal processor (DSP), a processor with controlling software, a programmable logic device (PLD), a field programmable gate array (FPGA), or a programmable system-on-a-chip (PSOC), configured to read inputs and drive outputs responsive to the inputs.

DETAILED DESCRIPTION

Various sensor circuits may be used in a variety of computer, mechanical, and electro-mechanical systems. Such sensor circuits determine and relay environmental and/or operational information that can be used as part of a control mechanism. For example, to control servo motors, robotic arms, and collaborative robots (referred to as "cobots"), multiple rotation sensors may be employed.

One type of rotation sensor that can be employed in systems is an inductive angular position sensor. In such sensors, an excitation coil may be fabricated on a printed circuit board ("PCB"), while a rotor that is made from conductive material is connected to an object whose rotation is to be measured, and rotates above the PCB and excitation coil.

When a current is driven through the excitation coil, a resultant magnetic field induces a current into the rotor. As the induced current flows in the rotor, another magnetic field is generated around the rotor which, in turn, induces respective currents or voltages in one or more receiver coils (referred to as "stators") that are also fabricated on the PCB.

The coupling of the magnetic field of the rotor into the one or more stators is a function of the angular position of the rotor to the stators. By measuring the voltage polarity and the voltage amplitude induced in the stators, the angle of the rotor relative to the stators can be determined.

In cases where two stators are employed, each with a different rotational symmetry over the measurement range, the signals from the two stators resolve to a unique angular position of the rotor, provided that the rotational symmetries do not have any common factors other than 1 (referred to as being "co-prime" or "relatively prime"). While such an arrangement of a rotor and stators is relatively immune to rotor eccentricity (i.e., the center of rotation is not above the center of the stator), and rotor tilt (i.e., the axis of rotation is not perpendicular to the plane of the stator), error can result from a lateral movement and tilt of the rotor. In such cases, the coupling between the rotor and the stators will not be completely compensated, which is referred to as "run-out error" and can lead to incorrect determination of the angular position of the rotor.

Such run-out error is proportional to the product of the eccentricity and tilt values, and is dependent on the geometry of the sensor. For example, a sensor with a high count per revolution is more sensitive than a sensor with a lower count per revolution. The ratio between the high-count error and low-count error is, however, constant.

The embodiments described herein may provide techniques for compensating for run-out error in an inductive angular position sensor. Using a difference between a low-count sensor signal and a high-count sensor signal, the error introduced by a combination of lateral movement and tilt can be remediated. The addition of a calibration mode enables compensating for variations in tilt and eccentricity that vary over time.

FIG. 1 is a block diagram depicting an embodiment of a sensor subsystem. As illustrated, sensor subsystem 100 includes sensor 101 and interface circuit 102. In various embodiments, sensor 101 may include an inductive angular position sensor.

Sensor 101 is configured to generate fine sensor signals 103 and coarse sensor signals 104 based on a rotation of sensor 101. As described below, sensor 101 may include multiple receiver coils that generate corresponding sensor signals. In some cases, a first set of receiver coils may be used to generate fine sensor signals 103, and a second set of receiver coils may be used to generate coarse sensor signals 104. For example, in some embodiments, two receiver coils may be used to generate the two signals included in fine sensor signals 103, and two other receiver coils may be used to generate the two signals included in coarse sensor signals 104. In some embodiments, the different receiver coils have different geometries that produce a different number of pulses (or "counts") for a complete rotation. In the present embodiment, fine sensor signals 103 has a larger number of pulses for one rotation of sensor 101 than does coarse sensor signals 104. Although sensor 101 is depicted as generating two sensor signals, in other embodiments, sensor 101 may generate any suitable number of sensor signals.

Interface circuit 102 is configured to generate absolute angle value 105 using fine sensor signals 103 and coarse sensor signals 104. Additionally, interface circuit 102 is configured to generate absolute angle value 106 using coarse sensor signals 104 and fine sensor signals 103. In various embodiments, a most significant portion of absolute angle value 105 is based on fine sensor signals 103, while a least significant portion of absolute angle value 105 is based on coarse sensor signals 104. For example, the hundreds and tens portion of absolute angle value 105 may be based on fine sensor signals 103, while the ones and fractional parts of absolute angle value 105 may be based on coarse sensor signals 104. In a similar fashion, a most significant portion of absolute angle value 106 is based on coarse sensor signals 104, while a least significant portion of absolute angle value 106 is based on fine sensor signals 103.

As described below, to generate absolute angle value 105 and absolute angle value 106, interface circuit 102 may be configured to perform an analog-to-digital conversion operation on coarse sensor signals 104 and fine sensor signals 103.

In various embodiments, interface circuit 102 is configured to generate output angle 107 using a difference between absolute angle value 105 and absolute angle value 106. As described below, to generate output angle 107, interface circuit 102 may be further configured to retrieve, from a lookup table, an average error value using absolute angle value 106. Interface circuit 102 may be further configured to generate output angle 107 using the average error value.

In some embodiments, interface circuit 102 is configured to generate excitation current 108, which sensor 101 is configured to use to generate fine sensor signals 103 and coarse sensor signals 104. Excitation current 108 may, in various embodiments, be an alternating current.

Figure 2:
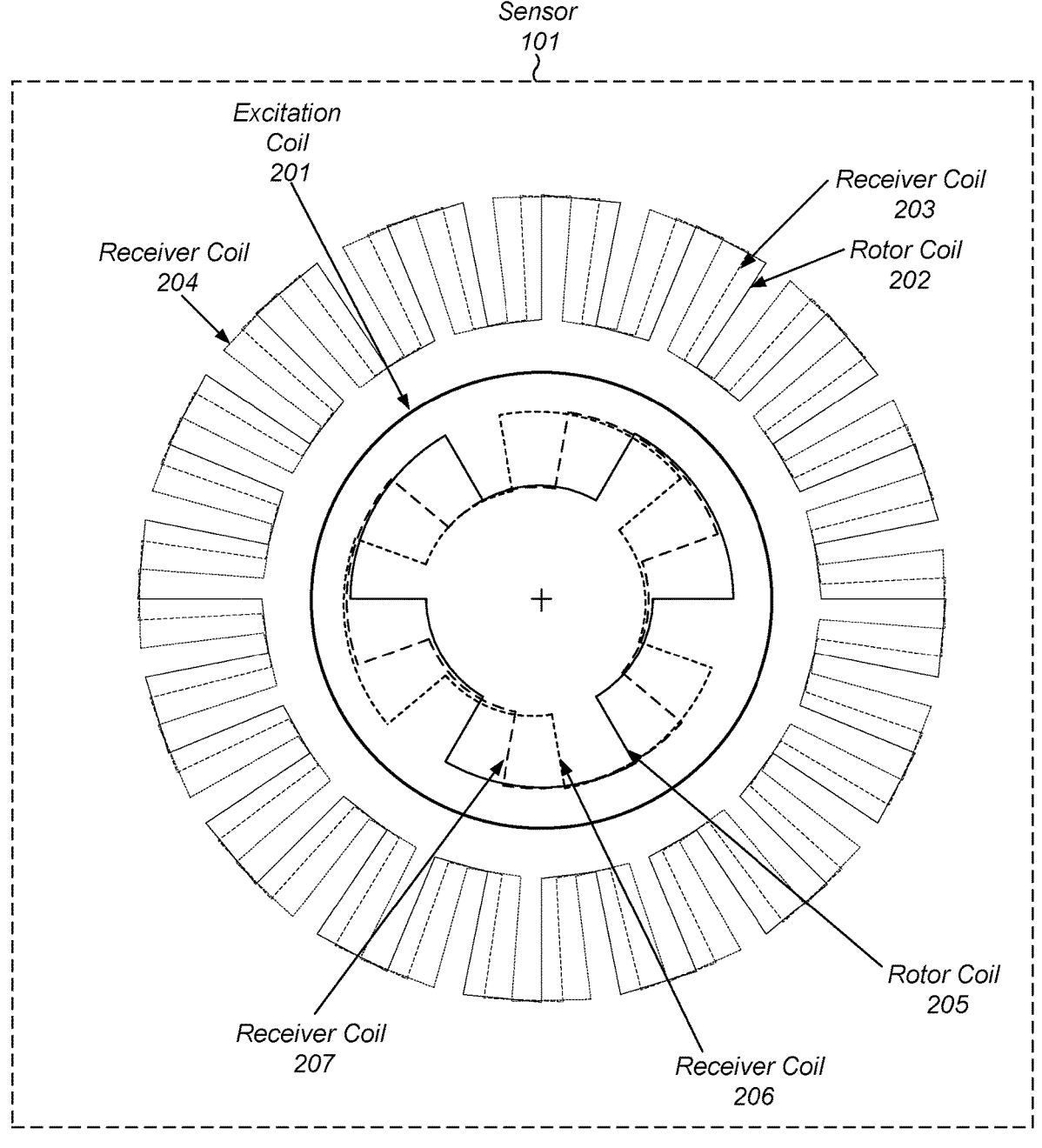
FIG. 2 is a block diagram of an embodiment of a sensor.

Turning to FIG. 2, a block diagram of an embodiment of sensor 101 is depicted. As illustrated, sensor 101 includes excitation coil 201, rotor coil 202, receiver coil 203, receiver coil 204, rotor coil 205, receiver coil 206, and receiver coil 207. In various embodiments, rotor coil 202, receiver coil 203, and receiver coil 204 form a fine sensor that is configured to generate fine sensor signals 103, while rotor coil 205, receiver coil 206, and receiver coil 207 form a coarse sensor that is configured to generate coarse sensor signals 104.

Excitation coil 201 is fabricated (or "printed") on a PCB (not shown). In various embodiments, excitation coil 201 is fabricated using copper or any other suitable material that can be printed on a PCB. Although excitation coil 201 is depicted as a single trace, in other embodiments, excitation coil 201 may include multiple concentric traces.

Rotor coils 202 and 205 are fabricated from a conductive material and are configured to rotate above the PCB. In various embodiments, rotor coils 202 and 205 rotate in response to a change in rotational position of a specific object, e.g., a robotic arm. Additionally, rotor coils 202 and 205 may rotate in response to interface circuit 102 activating a calibration mode. In such cases, rotor coils 202 and 205 rotate through 360 degrees with measurements taken by interface circuit 102 at various angles. During the calibration mode, rotor coils 202 and 205 may rotate independently of an object, e.g., a robotic arm, to which rotor coil 204 is attached.

Receiver coils 203 and 204 are also fabricated from a conductive material on the PCB. In a similar fashion, receiver coils 206 and 207 are also fabricated from a conductive material on the PCB. In various embodiments, receiver coils 203 and 204 have different geometries than receiver coils 206 and 207. In some cases, receiver coils 203 and 204 may have more loops away from the center to increase resolution relative to receiver coils 206 and 207. Although only two receiver coils are depicted for each of the fine and coarse sensors in the embodiment of FIG. 2, in other embodiments, any suitable number of receiver coils may be employed for the fine and coarse sensors.

To measure the rotation of rotor coil 202, interface circuit 102 is configured to apply an alternating current signal to excitation coil 201. As the alternating current flows in excitation coil 201, a magnetic field is generated around excitation coil 201. In various embodiments, the coupling from excitation coil 201 to rotor coils 202 and 205 is independent of the angular position of rotor coils 202 and 205, but is a function of a distance between excitation coil 201 and rotor coils 202 and 205.

The magnetic field generated by excitation coil 201 induces a current in rotor coils 202 and 205, which, in turn, generates a magnetic field around rotor coils 202 and 205. The magnetic field generated by the induced current in rotor coils 202 and 205 couples into receiver coils 203, 204, 206, and 207. The coupling from a given rotor coil to a given receiver coil is a function of both the distance between the given rotor coil and the given receiver coil, as well as the angular position of the given rotor coil and the given receiver coil. It is noted, however, that since rotor coil 202 has different rotational symmetry than receiver coils 206 and 207, there is minimal coupling between rotor coil 202 and receiver coils 206 and 207. In a similar fashion, since rotor coil 205 has different rotational symmetry than receiver coils 203 and 204, there is minimal coupling between rotor coil 205 and receiver coils 203 and 204.

The magnetic field generated by rotor coil 204 induces respective currents or voltages in both receiver coils 202 and 203. As described below, interface circuit 102 is configured to measure the polarity and amplitude of the respective voltages of receiver coils 202 and 203. Using the polarity and amplitude measurements, interface circuit 102 is further configured to determine output angle 107. As described above, a number of peaks in the signals of receiver coils 202 and 203 can depend on the geometry of receiver coils 202 and 203. In various embodiments, receiver coil 202 may generate coarse sensor signals 104, while receiver coil 203 may generate fine sensor signals 103.

Figure 3:
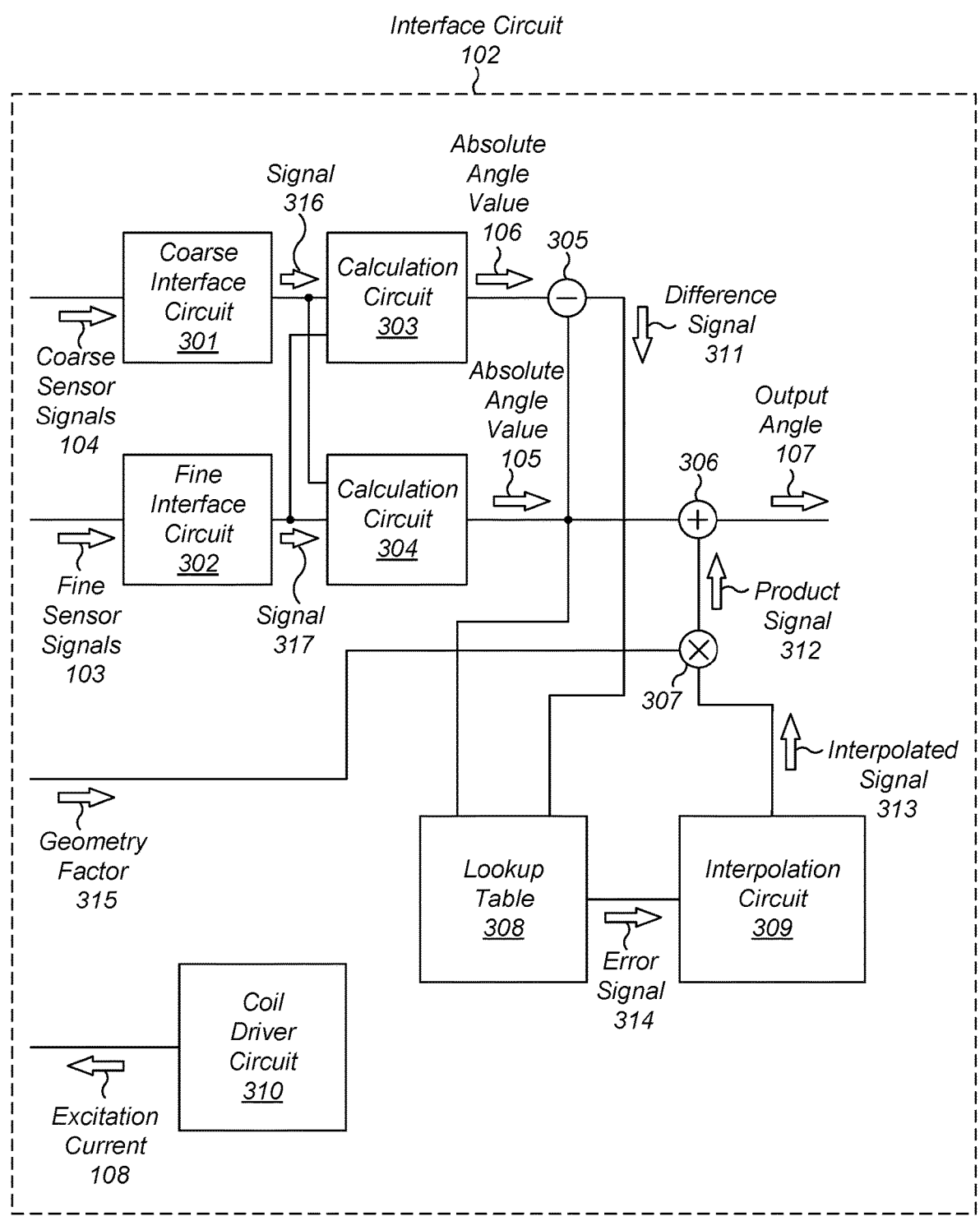
FIG. 3 is a block diagram of an embodiment of an interface circuit for a sensor subsystem.

Turning to FIG. 3, a block diagram of interface circuit 102 is depicted. As illustrated, interface circuit 102 includes coarse interface circuit 301, fine interface circuit 302, calculation circuit 303, calculation circuit 304, subtractor circuit 305, adder circuit 306, multiplier circuit 307, lookup table 308, interpolation circuit 309, and coil driver circuit 310.

Coarse interface circuit 301 is configured to generate signal 316 using coarse sensor signals 104. In various embodiments, signal 316 may be a digital signal that includes multiple bits of data. In such cases, coarse interface circuit 301 may include an analog-to-digital converter circuit configured to translate an amplitude of coarse sensor signals 104 into the multiple bits of data.

Fine interface circuit 302 is configured to generate signal 317 using fine sensor signals 103. Like signal 316, signal 317 may also be a digital signal that includes multiple bits of data. In various embodiments, fine interface circuit 302 may include an analog-to-digital converter circuit configured to generate the multiple bits of data based on an amplitude of fine sensor signals 103.

Calculation circuit 303 is configured to generate absolute angle value 106 using signal 316 and signal 317. In various embodiments, calculation circuit 303 may be configured to calculate absolute angle value 106 such that a most significant portion of absolute angle value 106 is based on signal 316, while a least significant portion of absolute angle value 106 is based on signal 317. In some embodiments, calculation circuit 303 may be implemented using a controller, or any other suitable combination of combinatorial and sequential logic circuits.

Calculation circuit 304 is configured to generate absolute angle value 105 using signal 316 and signal 317. In various embodiments, calculation circuit 304 may be configured to calculated absolute angle value 105 such that a most significant portion of absolute angle value 105 is based on signal 317, while a least significant portion of absolute angle value 105 is based on signal 316. In some embodiments, calculation circuit 303 may be implemented using a controller, or any other suitable combination of combinatorial and sequential logic circuits.

It is noted that, in some embodiments, calculation circuits 303 and 304 may be interchangeable. For example, calculation circuit 304 may be used to generate absolute angle value 106, while calculation circuit 303 may be used to generate absolute angle value 105.

Subtractor circuit 305 is configured to generate difference signal 311 using absolute angle value 106 and absolute angle value 105. In various embodiments, to generate difference signal 311, subtractor circuit 305 may be configured to subtract absolute angle value 106 from absolute angle value 105.

Adder circuit 306 is configured to generate output angle 107 using absolute angle value 105 and product signal 312. In various embodiments, to generate output angle 107, adder circuit 306 may be configured to add absolute angle value 105 to product signal 312. Although the embodiment of FIG. 3 depicts adder circuit 306 combining absolute angle value 105 and product signal 312 to generate output angle 107, in other embodiments, adder circuit 306 may be configured to combine absolute angle value 106 and product signal 312 to generate output angle 107.

In the case of an ideal sensor, absolute angle value 106 and absolute angle value 105 would be identical. Noise on coarse sensor signals 104 and fine sensor signals 103 can result in noise in absolute angle value 106 and absolute angle value 105, respectively, resulting in a difference between the two angle values. In various embodiments, such noise may include random noise in the system. In some cases, the noise on coarse sensor signals 104 and fine sensor signals 103 may include systematic error due to tilt and eccentricity between the receiver coils and the rotor coils of sensor 101. To remove the random portion of the noise, difference signal 311 (which is the difference between absolute angle value 106 and absolute angle value 105) can be averaged and stored in lookup table 308. Averaging difference signal 311 will, however, preserve any systematic error.

Lookup table 308 is configured to store multiple error average values for corresponding ranges of angles. In various embodiments, lookup table 308 is configured to select a particular error average using absolute angle value 105 to generate error signal 314. In various embodiments, running averages of error values, i.e., the differences between absolute angle value 106 and absolute angle value 105, are generated and stored in lookup table 308 during calibration modes. Alternatively, the values in lookup table 308 can be continuously updated by detecting when absolute angle value 105 is within a particular range of values and then, upon detecting such a situation, updating the corresponding error average. By updating the error averages in such a fashion, sensor subsystem 100 can tolerate variation in tilt and eccentricity of rotor coil 204 over time due to rotor shaft bearing wear and tear.

Interpolation circuit 309 is configured to generate interpolated signal 313 using multiple error signals, e.g., error signal 314, from lookup table 308. In various embodiments, interpolation circuit 309 may be configured to perform a piece-wise linear interpolation between the error average values stored in lookup table 308 to generate interpolated signal 313.

During non-calibration operation (referred to as "run mode"), data stored in lookup table 308 can be used to correct the measured angle value. Prior to combining the interpolated data from lookup table 308, i.e., interpolated signal 313, with absolute angle value 105, interpolated signal 313 may be scaled based on the geometry of receiver coils 203, 204, 206, and 207. Such scaling is accomplished by multiplier circuit 307.

Multiplier circuit 307 is configured to generate product signal 312 using interpolated signal 313 and geometry factor 315. In various embodiments, geometry factor 315 is based on the respective geometries of receiver coils receiver coils 203, 204, 206 and 207 in sensor 101. In some cases, geometry factor 315 is determined by simulation, or measurement in a laboratory, and then added to software/ firmware used by interface circuit 102. In some cases, geometry factor 315 may be based on respective diameters and counts-per-revolution of receiver coils 203, 204, 206 and 207.

Adder circuit 306 is configured to generate output angle 107 using absolute angle value 105 and product signal 312. In various embodiments, to generate output angle 107, adder circuit 306 may be configured to add absolute angle value 105 to product signal 312.

Coil driver circuit 310 is configured to generate excitation current 108. As described above, excitation current 108 may be an alternating current. In such cases, coil driver circuit 310 may be implemented using an inductor-capacitor (or "LC") oscillator circuit, or any other suitable circuit configured to generate an alternating current.

Turning to FIG. 4, a block diagram of lookup table 308 is depicted. As illustrated, lookup table 308 stores error average values for multiple different angle ranges of absolute angle value 105, which corresponds to fine sensor signals 103. For a given angle range, lookup table 308 stores a corresponding error average value. For example, for angles between 22.5 and 45 degrees, lookup table 308 stores error average value 402. Although sixteen entries are depicted in the embodiment depicted in FIG. 4, in other embodiments, any suitable number of entries may be employed. In various embodiments, a number of entries included in lookup table 308 may be based on a desired resolution of the error average values.

As described above, a given error average value is read from lookup table 308 as part of the process to generate output angle 107 for a new rotational position of sensor 101. Error average values 401-416 are updated as running averages during a calibration operation.

It is noted that circuitry for reading and writing information into lookup table 308 has been omitted from the diagram of FIG. 4 for clarity. In various embodiments, lookup table 308 may be implemented using multiple static random-access memory (SRAM) storage cells, non-volatile memory circuits (e.g., EEPROM or Flash), decoder circuits, sense amplifier circuits, and the like.

Figure 5:
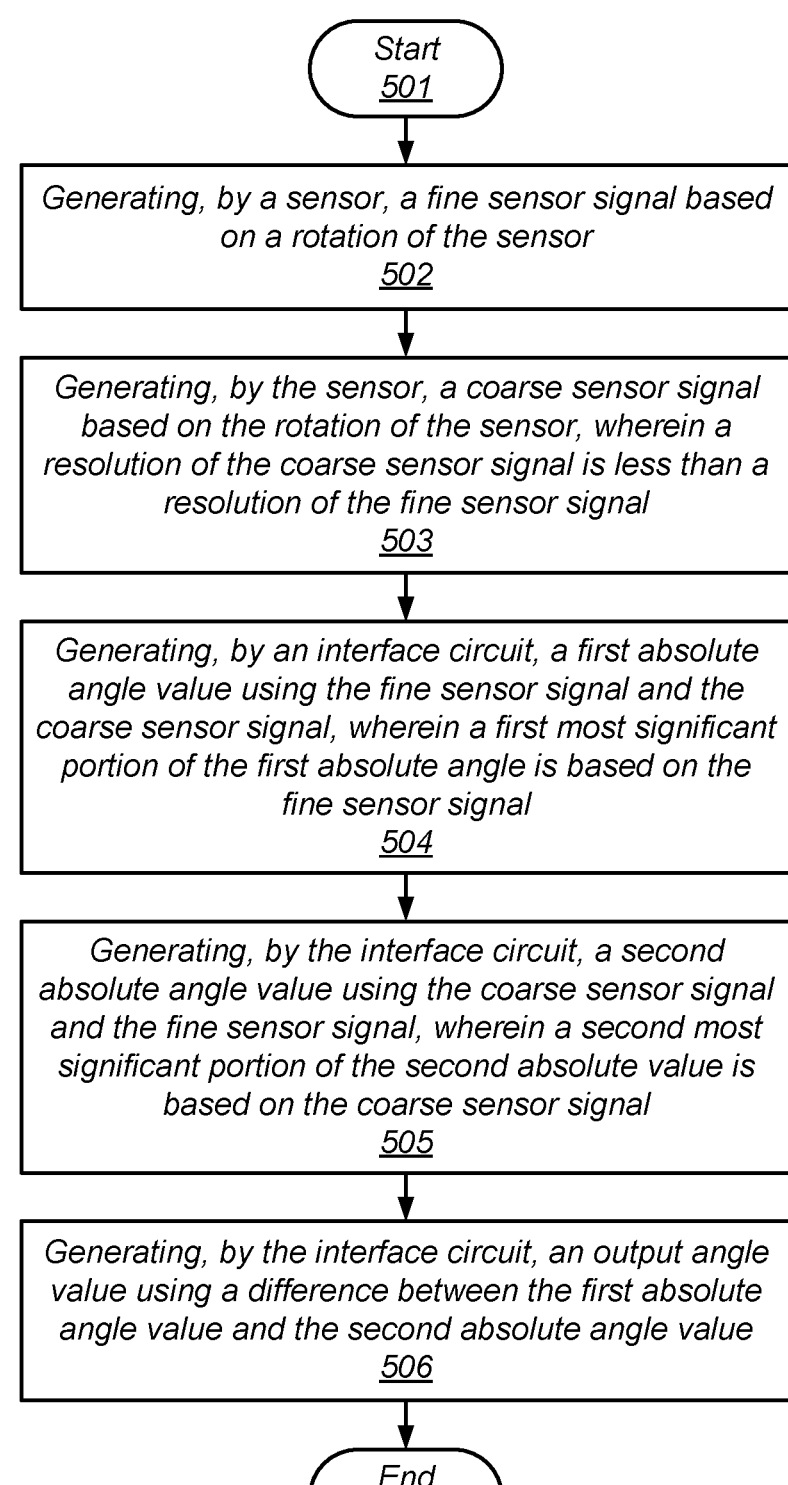
FIG. 5 is a flow diagram of an embodiment of a method for operating a sensor.

Turning to FIG. 5, a flow diagram depicting an embodiment of a method for operating a sensor is illustrated. The method, which may be applied to various sensors, begins in block 501.

The method includes generating, by a sensor, a fine sensor signal based on a rotation of the sensor (block 502). In various embodiments, the sensor includes an inductive angular position sensor that includes an excitation coil, a rotor coil, a first set of receiver coils, and a second set of receiver coils. In some embodiments, generating the coarse and fine sensor signals includes applying an alternating current (AC) to the excitation coil.

The method includes generating, by the sensor, a coarse sensor signal based on the rotation of the sensor (block 503). In various embodiments, a resolution of the coarse sensor signal is less than a resolution of the fine sensor signal. In some embodiments, generating the coarse sensor signal includes generating a voltage in a second set of receiver coils included in the inductor angular position sensor.

The method further includes generating, by an interface circuit, a first absolute angle value using the coarse and fine sensor signals (block 504). In various embodiments, a first most significant portion of the first absolute angle value is based on the fine sensor signal. In some embodiments, generating the first absolute angle includes performing analog-to-digital conversions of the coarse and fine sensor signals.

The method also includes generating, by the interface circuit, a second absolute angle value using the fine and coarse sensor signal (block 505). In various embodiments, a second most significant portion of the second absolute angle value is based on the coarse sensor signal. In some embodiments, generating the second absolute angle value includes performing analog-to-digital conversions of the fine and coarse sensor signals.

The method further includes generating, by the interface circuit, an output angle value using a difference between the first absolute angle value and the second absolute angle value (block 506). In various embodiments, generating the output angle value includes retrieving, by the interface circuit using the first absolute angle value, a particular average error value from a lookup table configured to store a plurality of average error values for a corresponding plurality of fine angle ranges. In some embodiments, the method may further include combining, by the interface circuit, the particular average error value with a predetermined geometry value to generate a product value, and combining, by the interface circuit, the product value and the first absolute angle value to generate the output angle value. Alternatively, the method may include combining, by the interface circuit, the product value and the second absolute angle value to generate the output angle value.

In various embodiments, the method may further include averaging, by the interface circuit over a range of measurements, a difference between the first absolute angle value and the second absolute angle value. The method may additionally include updating, by the interface circuit, the lookup table using a result from the averaging. In some embodiments, the method may include generating an error signal in response to determining that a given average error value for a given range of angles stored in the lookup table exceeds a threshold value. The method concludes in block 507.

Figure 6:
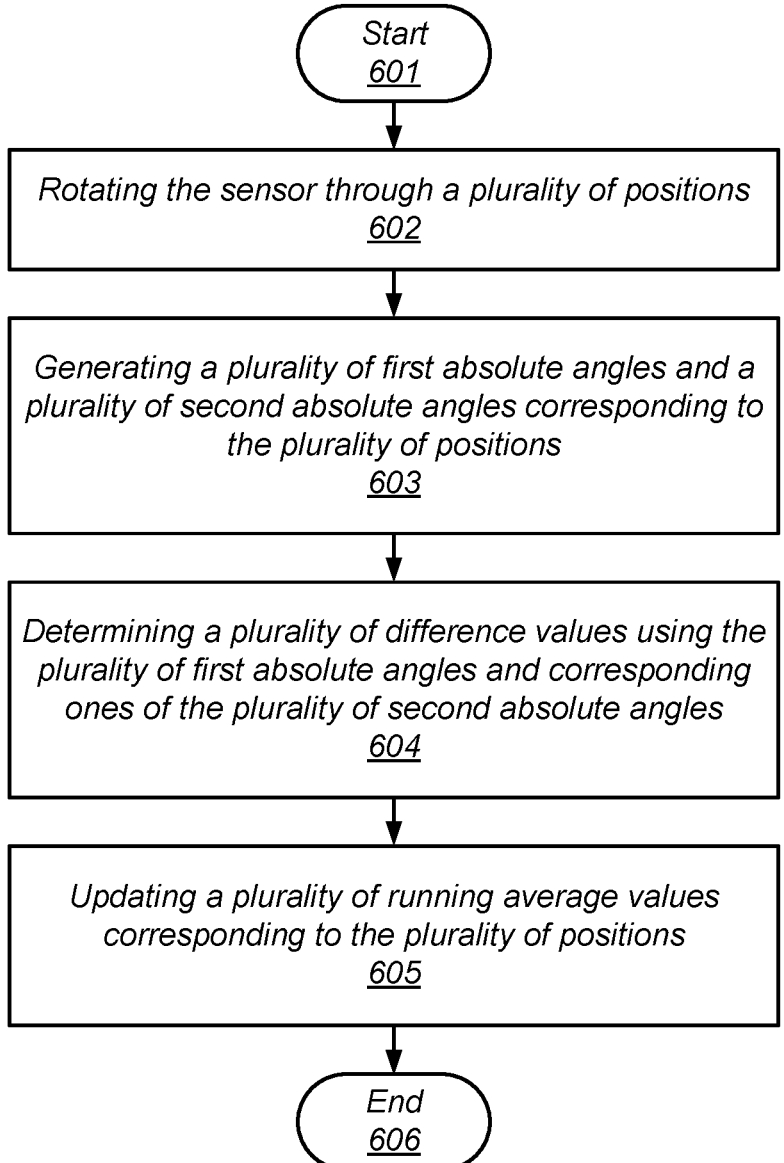
FIG. 6 is flow diagram of an embodiment of a method for calibrating a sensor.

To remove noise from sensor subsystem 100, the difference between the fine angle value and the coarse angle value can be averaged over a large number of measurements. Such averaging can be performed during a calibration operation during which sensor 101 is moved through a range of angles. A flow diagram depicting an embodiment of a method for performing such a calibration operation is depicted in FIG. 6. The method, which may be applied to various sensor subsystems, e.g., sensor subsystem 100, begins in block 601.

The method includes rotating the sensor through a plurality of positions (block 602). In various embodiments, rotating the sensor through the plurality of positions includes rotating, for a predetermined number of times, rotor coils 202 and 205 in sensor 101 by a predetermined number of rotations. In various embodiments, the number of rotations may be based on a resolution of sensor 101.

The method further includes generating a plurality of first absolute angles and a plurality of second absolute angles corresponding to the plurality of positions (block 603). In various embodiments, generating the plurality of first absolute angles and the plurality of second absolute angles includes performing an analog-to-digital conversion on fine sensor signals 103 and coarse sensor signals 104 at each of the plurality of positions.

The method also includes determining a plurality of difference values using the plurality of first absolute angles and corresponding ones of the plurality of second absolute angles (block 604). In various embodiments, determining the plurality of difference values includes subtracting a given second absolute angle from a corresponding first absolute angle.

The method further includes updating a plurality of running averages corresponding to the plurality of positions (block 605). In some embodiments, updating the plurality of running averages includes retrieving a particular running average value from a lookup table, updating the particular running average value, and storing the updated particular running average value back into the lookup table. The method concludes in block 606.

Figure 7:
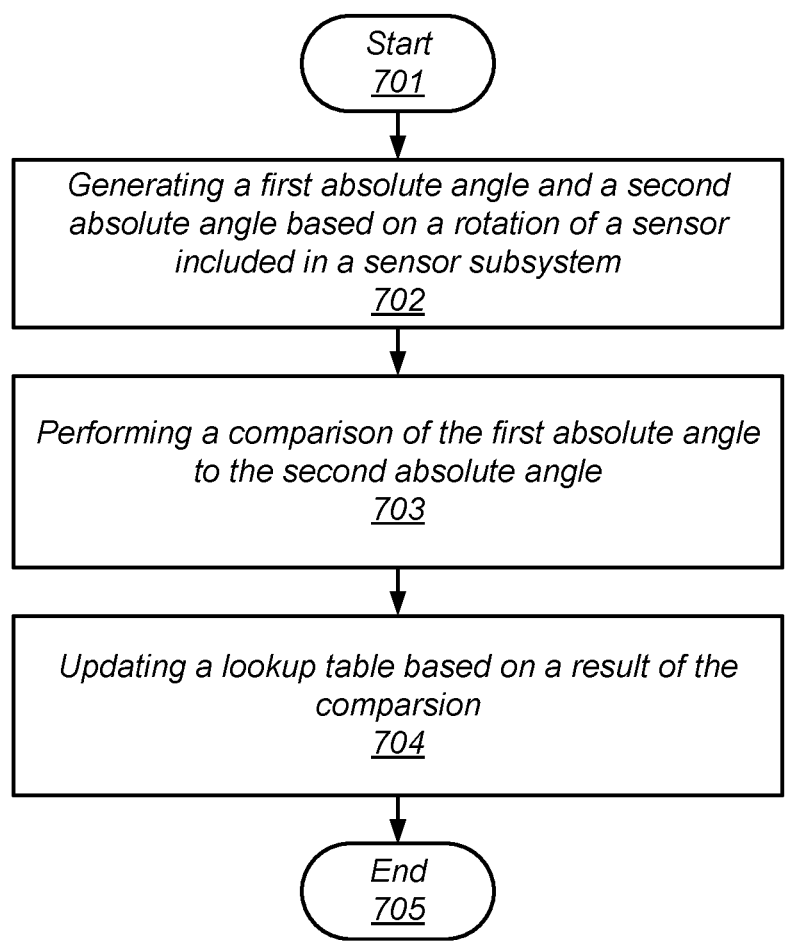
FIG. 7 is a flow diagram of an embodiment of a method for performing continuous calibration for a sensor.

In various embodiments, a calibration operation may be run in parallel with measurement operation. A flow diagram depicting an embodiment of a method for performing measurement and calibration operations in parallel is illustrated in FIG. 7. The method, which may be applied to various sensor subsystem, e.g., sensor subsystem 100 as depicted in FIG. 1, begins in block 701.

The method includes generating a first absolute angle and a second absolute angle based on a rotation of a sensor included in the sensor subsystem (block 702). In various embodiments, the method further includes generating an output angle value based on a difference between the first absolute angle and the second absolute angle. In some cases, generating the output angle value includes retrieving an average error value from a lookup table.

The method also includes performing a comparison of the first absolute angle and the second absolute angle (block 703). In various embodiments, performing the comparison of the first absolute angle and the second absolute angle includes determining a difference between the first absolute angle and the second absolute angle, and comparing the difference to a threshold value.

The method further includes updating the lookup table based on a result of the comparison (block 704). In some embodiments, updating the lookup table includes retrieving a particular value from the lookup table and averaging the particular value with a new value based on the first absolute angle and the second absolute angle. In such cases, the method also includes updating the lookup table with the average of the particular value and the new value. The method concludes in block 705.

Figure 8:
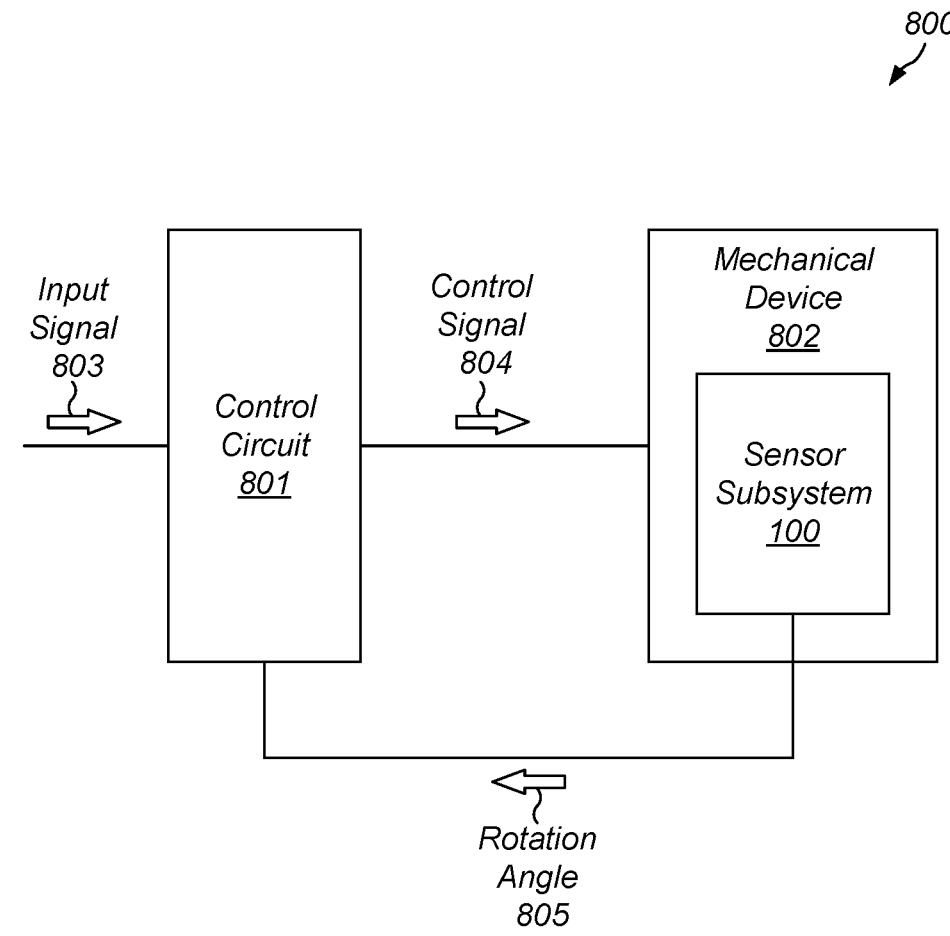
FIG. 8 is a block diagram of an embodiment of a system to control rotation of a portion of a mechanical device.

Turning to FIG. 8, a block diagram of a system configured to control rotation of a portion of a mechanical device is depicted. As illustrated, system 800 includes control circuit 801 and mechanical device 802, which includes sensor subsystem 100. In various embodiments, system 800 may be used as part of a servo motor control mechanism, a robotic limb control mechanism, a cobot control mechanism, or any other suitable control mechanism.

Control circuit 801 is configured to receive input signal 803. In various embodiments, input signal 803 may be either a digital or analog circuit whose value indicates an amount to rotate all or a portion of mechanical device 802. In various embodiments, control circuit 801 may be configured to generate control signal 804 using input signal 803.

In response to receiving control signal 804, mechanical device 802 may be configured to rotate at least a portion of itself, e.g., a robotic limb. For example, mechanical device 802 may be configured to activate a motor in response to an activation of control signal 804. The motor may then cause a portion of mechanical device 802 to rotate while control signal 804 is active.

As described above, sensor subsystem 100 is configured to generate rotation angle 805 based on the rotation of the portion of mechanical device 802. In various embodiments, rotation angle 805 may correspond to output angle 107 and may include a word of digital data including any suitable number of bits to achieve a desired resolution of rotation angle 805.

Control circuit 801 may be further configured to deactivate control signal 804 based on rotation angle 805. In various embodiments, control circuit 801 may be configured to compare rotation angle 805 to a desired rotation angle. In response to a determination that rotation angle 805 is within a threshold value of the desired rotation angle, control circuit 801 may deactivate control signal 804. Control circuit 801 may be implemented using controller.

The present disclosure includes references to "an embodiment" or groups of "embodiments." As used herein, embodiments are different implementations of instances of the disclosed concepts. References to "an embodiment," "some embodiments," and the like do not necessarily refer to the same embodiment. Many embodiments are possible and contemplated, including those specifically disclosed as well as modifications or alternatives that fall within the spirit or scope of the disclosure.

The above disclosure is meant to illustrate some of the principles and various embodiments of the disclosed concepts. Numerous variations and modifications will become apparent to those skilled in the art once the above disclosure is fully appreciated. It is intended that the following claims be interpreted to embrace all such variations and modifications.

What is claimed is:

1. An apparatus, comprising:
   a sensor configured to generate a fine sensor signal and a coarse sensor signal based on a rotation of the sensor; and
   an interface circuit that includes a lookup table configured to store a plurality of average error values for a corresponding plurality of angle ranges, wherein the interface circuit is configured to:
      generate a first absolute angle value using the fine sensor signal and the coarse sensor signal, wherein a first most significant portion of the first absolute angle value is based on the fine sensor signal;
      generate a second absolute angle value using the coarse sensor signal and the fine sensor signal, wherein a second most significant portion of the second absolute angle value is based on the coarse sensor signal;
      retrieve a particular average error value from the lookup table using one of the first absolute angle value or the second absolute angle value; and
      generate an output angle value using the particular average error value, and a difference between the first absolute angle value and the second absolute angle value.

2. The apparatus of claim 1, wherein the sensor includes an inductive angular position sensor.

3. The apparatus of claim 1, wherein to generate the first absolute angle value, the interface circuit is configured to perform a first analog-to-digital conversion operation using the fine sensor signal, and wherein to generate the second absolute angle value, the interface circuit is configured to perform a second analog-to-digital conversion operation using the coarse sensor signal.

4. The apparatus of claim 1, wherein the interface circuit is further configured to:

combine the particular average error value with a predetermined geometry value to generate a product value; and combine the product value and the first absolute angle value or the second absolute angle value to generate the output angle value.

5. The apparatus of claim 1, wherein the interface circuit is further configured to update a given average error value stored in the lookup table using a difference of the first absolute angle value and the second absolute angle value.

6. The apparatus of claim 1, wherein to retrieve the particular average error value from the lookup table, the interface circuit is further configured to interpolate between a first error value and a second error value.

7. A method, comprising:

generating, by a sensor, a fine sensor signal based on a rotation of the sensor;

generating, by the sensor, a coarse sensor signal based on the rotation of the sensor, wherein a resolution of the coarse sensor signal is less than a resolution of the fine sensor signal;

generating, by an interface circuit, a first absolute angle value using the fine sensor signal and the coarse sensor signal, wherein a first most significant portion of the first absolute angle value is based on the fine sensor signal;

generating, by the interface circuit, a second absolute angle value using the coarse sensor signal and the fine sensor signal, wherein a second most significant portion of the second absolute angle value is based on the coarse sensor signal;

retrieving, by the interface circuit using the first absolute angle value, a particular average error value from a lookup table configured to store a plurality of average error values for a corresponding plurality of fine angle ranges; and generating, by the interface circuit, an output angle value using the particular average error value, and a difference between the first absolute angle value and the second absolute angle value.

8. The method of claim 7, wherein generating the first absolute angle value includes converting, by the interface circuit, the fine sensor signal to a first digital value, and wherein generating the second absolute angle value includes converting, by the interface circuit, the coarse sensor signal to a second digital value.

9. The method of claim 7, wherein generating the output angle value includes:

combining, by the interface circuit, the particular average error value with a predetermined geometry value to generate a product value; and combining, by the interface circuit, the product value and the first absolute angle value or the second absolute angle value to generate the output angle value.

10. The method of claim 7, further comprising:

averaging, by the interface circuit over a range of measurements, a difference between the first absolute angle value and the second absolute angle value; and updating, by the interface circuit, the lookup table using a result from the averaging.

11. The method of claim 7, further comprising generating an error signal in response to determining a given average error for a given range of angle values stored in the lookup table exceeds a threshold value.

12. The method of claim 7, wherein the sensor includes an inductive angular position sensor.

13. The method of claim 7, wherein retrieving the particular average error value from the lookup table includes interpolating, by the interface circuit, between a first error value and a second error value.

14. A system, comprising:

a mechanical device that includes a component configured to rotate based on a control signal;

a sensor subsystem that includes a lookup table configured to store a plurality of average error values for a corresponding plurality of angle ranges, wherein the sensor subsystem is configured to:

generate a fine sensor signal based on a position of the component;

generate a coarse sensor signal based on the position of the component;

generate a first absolute angle value using the fine sensor signal and the coarse sensor signal, wherein a first most significant portion of the first absolute angle value is based on the coarse sensor signal;

generate a second absolute angle value using the coarse sensor signal and the fine sensor signal, wherein a second most significant portion of the second absolute angle value is based on the fine sensor signal;

retrieve, from the lookup table using the first absolute angle value, a particular average error value; and generate a rotation angle using the particular average error value, and a difference between the first absolute angle value and the second absolute angle value; and a control circuit configured to generate the control signal using an input signal and the rotation angle.

15. The system of claim 14, wherein to generate the first absolute angle value, the sensor subsystem is further configured to convert the fine sensor signal to a first digital value, and wherein to generate the second absolute angle value, the sensor subsystem is further configured to convert the coarse sensor signal to a second digital value.

16. The system of claim 14, wherein the sensor subsystem is further configured to:

combine the particular average error value with a predetermined geometry value to generate a product value; and combine the product value and the first absolute angle value to generate the rotation angle.

17. The system of claim 14, wherein the sensor subsystem is further configured to:

generate, over a range of measurements, an average value of a difference between the first absolute angle value and the second absolute angle value; and update, using the average value, the lookup table.

18. The system of claim 17, wherein the sensor subsystem is further configured to update the lookup table in response to an activation of a calibration mode.

19. The system of claim 14, wherein the sensor subsystem includes an inductive angular position sensor coupled to the component.

20. The system of claim 14, wherein to retrieve the particular average error value, the sensor subsystem is further configured to interpolate between a first error value and a second error value.

* * * * *